Patented Nov. 26, 1935

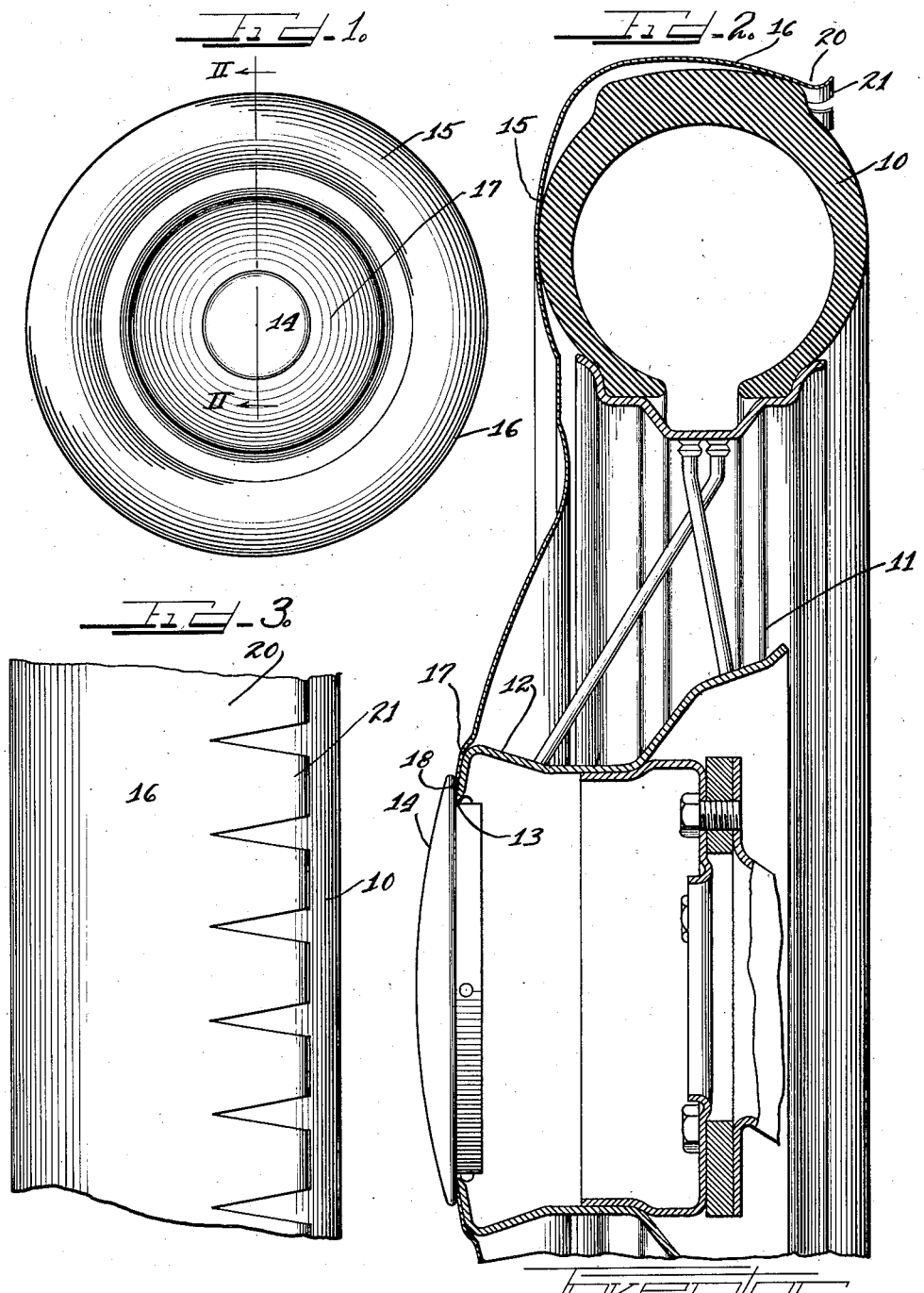

2,021,892

UNITED STATES PATENT OFFICE 2,021,892

SPARE TIRE COVER

George Albert Lyon, Detroit, Mich., assignor to Lyon Incorporated, Detroit, Mich., a corporation of Delaware Application August 19, 1933, Serial No. 685,834

1 Claim. (Cl. 150—54)

This invention relates to spare tire and wheel covers and more particularly to a spare tire cover especially adapted for use with a tire mounted on a wheel having a centrally disposed hub on which is mounted the usual hub cap.

An object of this invention is to provide a unitary cover of simple construction and adapted to be applied with ease to the tire and thereafter yieldably embrace the tire to insure proper cooperation between the cover and the tire.

Another object of this invention is to provide a cover for a spare tire and wheel which is adapted to be centrally supported by the wheel and to yieldably embrace the rear of the tire.

In accordance with the general features of this invention, there is provided a spare tire and wheel cover including a disc like side portion for disposition over an outer side of the tire and having a central part formed to be supported by the hub of the spare wheel and which side portion has associated with it a tread covering portion which is provided to the rear of the median plane of the tire with a circumferentially extending and inwardly projecting serrated part for yieldably engaging the rear of the tire.

In accordance with another feature of the invention, the serrated part is made in the form of a plurality of inwardly projecting fingers, the outer end of each of which is slightly turned outwardly and which fingers are adapted to be cammed outwardly during the act of mounting the cover on the tire and to thereafter embrace the rear of the tire by reason of the inherent resiliency of the fingers.

Other objects and features of this invention will more fully appear from the following detailed description taken in connection with the accompanying drawing which illustrates a single embodiment thereof, and in which Figure 1 is a side view of a cover of my invention showing it applied to a spare tire and wheel.

Figure 2 is an enlarged fragmentary cross-sectional view taken on substantially the line II—II of Figure 1 looking in the direction indicated by the arrows.

Figure 3 is a fragmentary plan view of a portion of the structure shown in Figure 2 illustrating the serrated rear edge of the tread covering portion of the cover.

The reference character 10 designates generally a spare tire applied to a spare wheel 11 including a centrally disposed hub 12. The spare wheel hub 12 has a centrally disposed opening 13 formed to accommodate the usual hub cap 14 which may be of any suitable conventional configuration. This spare wheel and tire is of a conventional construction and is adapted to be mounted in any of the conventional ways upon an automotive vehicle.

My present invention is concerned with a tire cover for a spare wheel installation such as that shown in Figure 2. The cover embodies a circular disc like side portion 15 for disposition over an outer side of the spare tire 10 and an integral circular tread covering portion 16. Both of portions 15 and 16 are of curved transverse cross-section so as to conform with the contour of the spare tire 10.

The side disc 15 includes an outwardly bowed central part 17 having a centrally disposed opening 18 of a size substantially commensurate with that of the opening 13 so as to permit of the mounting of the conventional hub cap 14 in the wheel hub 12. It will also be noted from Figure 2 that the central part 17 of the disc like portion 15 extends underneath the outer part of the hub cap 14 so as to be clamped against the wheel hub 12 by the hub cap 14. This construction is advantageous inasmuch as it enables the hub cap 14 to be utilized in centering the tire cover and in supporting the tire cover at the center of the spare wheel installation.

The tread covering portion 16 of the tire cover is provided with a circumferentially extending and inwardly projecting serrated rear edge 20. The diameter of this rear 20 is less than that of the outermost periphery of the tread of the tire 10 so that the fingers 21 comprising the serrated edge 20 must be deflected outwardly as the tire cover is shoved into proper tire protecting position on the tire 10. Thereafter, these fingers 21 due to their inherent resiliency contract into contact with the tire to the rear of the median plane of the tire. It should be noted that each of the fingers 21 is curved inwardly and then outwardly so that the outermost edge of each of these fingers will not bite into the tread of the tire as the serrated edge 20 is passed over the tread of the tire.

In order that these fingers 21 may be inherently resilient so as to provide for the above described action, it is of course necessary that they be made of some resilient material such for example as sheet metal. Accordingly, the tire cover which I have illustrated in the accompanying drawing may be made of any suitable sheet material which has the requisite resiliency to enable the fingers 21 to be inherently contracted into cover retaining cooperation with the rear of the spare tire 10.

The cover, however, is preferably made from sheet steel due to the resiliency of such material and the fact that such material is sufficiently rigid to cause the cover made therefrom to maintain a predetermined shape.

Now I desire it understood that although I have illustrated and described in detail the preferred embodiment of this invention, the invention is not to be thus limited but only insofar as defined by the scope and spirit of the appended claim.

I claim as my invention:

As an article of manufacture a spare tire and wheel cover including a disc like side portion for disposition over an outer side of the tire and having its central part formed to be supported by the hub of the spare wheel and an arcuate tread covering portion of curved transverse cross-section, and having its rear edge provided with a circumferentially extending and inwardly projecting serrated part for yieldably engaging the rear of the tire, said serrated part providing the cover with a plurality of resilient fingers outwardly turned at their ends adapted to yield outwardly as the cover is shoved into proper tire protecting position on the tire.

GEORGE ALBERT LYON.